US010366369B2

(12) United States Patent
Bryant et al.

(10) Patent No.: US 10,366,369 B2
(45) Date of Patent: Jul. 30, 2019

(54) CALENDAR AND EMAIL APPLICATION

(71) Applicant: BlackBerry Limited, Waterloo (CA)

(72) Inventors: Cody Stephen Bryant, Waterloo (CA); Grant Ross Elliott, Hamilton (CA); Andrew Joseph Klamut, Waterloo (CA); Kieran Patrick Cunney, Guelph (CA); Jared Daniel Lepic, Waterloo (CA); Bartholomew Alexander Boeckner, Brantford (CA)

(73) Assignee: BlackBerry Limited, Waterloo, Ontario (CA)

( * ) Notice: Subject to any disclaimer, the term of this patent is extended or adjusted under 35 U.S.C. 154(b) by 272 days.

(21) Appl. No.: 15/225,252

(22) Filed: Aug. 1, 2016

(65) Prior Publication Data
US 2018/0032968 A1 Feb. 1, 2018

(51) Int. Cl.
G06Q 10/10 (2012.01)
H04L 12/58 (2006.01)

(52) U.S. Cl.
CPC ......... G06Q 10/1095 (2013.01); G06Q 10/10 (2013.01); G06Q 10/109 (2013.01); H04L 51/22 (2013.01)

(58) Field of Classification Search
CPC ......... G06Q 10/00; G06Q 40/00; G06F 17/60
USPC ........................................ 705/7.19
See application file for complete search history.

(56) References Cited

U.S. PATENT DOCUMENTS

| 7,343,312 | B2 * | 3/2008 | Capek ................. G06Q 10/109 705/7.19 |
| 7,679,518 | B1 | 3/2010 | Pabla et al. |
| 8,073,725 | B2 | 12/2011 | Loring et al. |
| 8,578,301 | B2 * | 11/2013 | Klausmeier .......... G06Q 10/109 705/7.18 |
| 8,905,315 | B1 * | 12/2014 | Qureshi ............. G06Q 10/1095 235/375 |
| 2003/0154116 | A1 | 8/2003 | Lofton |
| 2005/0165831 | A1 * | 7/2005 | Solomon ................. G06F 16/10 |
| 2006/0200374 | A1 | 9/2006 | Nelken |
| 2007/0250370 | A1 | 10/2007 | Partridge et al. |

(Continued)

OTHER PUBLICATIONS

Negritoiu, S., "Freebusy", https://freebusy.io/chrome, last visited on Aug. 1, 2016, pp. 1-5.

(Continued)

Primary Examiner — Romain Jeanty
(74) Attorney, Agent, or Firm — Jose Gutman; Fleit Gibbons Gutman Bongini & Bianco P.L.

(57) ABSTRACT

An electronic user device 2 is disclosed in which a user interface 20 for an email application is displayed. The user interface 20 includes an email thread 22 and a selectable calendar look-up banner 32. Upon selection of the calendar look-up banner 32 the user device 2 is configured to retrieve electronic calendars respectively associated with the email users identified in the email thread 22. A score is then calculated for a plurality of time slots in the retrieved electronic calendars, and the time slots are displayed according to their score. A user can then make a selection of one of the time slots. A calendar event is then populated with information derived from the email thread 22 and is sent to each of the email addresses in the thread, to be added to their electronic calendars.

12 Claims, 3 Drawing Sheets

(56) References Cited

U.S. PATENT DOCUMENTS

| | | | |
|---|---|---|---|
| 2008/0005680 A1* | 1/2008 | Greenlee | G09D 3/12 |
| | | | 715/748 |
| 2009/0157466 A1 | 6/2009 | Bank et al. | |
| 2010/0088144 A1 | 4/2010 | Collet et al. | |
| 2012/0296982 A1 | 11/2012 | Heyman et al. | |
| 2013/0060592 A1 | 3/2013 | Motoyama | |
| 2013/0232213 A1 | 9/2013 | Bustamante | |
| 2013/0283211 A1* | 10/2013 | Malkin | G06Q 10/06 |
| | | | 715/844 |
| 2014/0244332 A1 | 8/2014 | Mermelstein | |
| 2015/0006217 A1 | 1/2015 | Buehl et al. | |
| 2015/0112749 A1 | 4/2015 | Erdal | |
| 2015/0356516 A1* | 12/2015 | Kagan | G06Q 10/1095 |
| | | | 705/7.19 |

OTHER PUBLICATIONS

Extended European Search Report issued for European Patent Application No. 17180361.2, dated Aug. 28, 2017.
Communication pursuant to Article 94(3) EPC dated Sep. 9, 2018 for European Patent Application No. 17180361.2.

\* cited by examiner

CALENDAR AND EMAIL APPLICATION

TECHNICAL FIELD

The disclosed embodiments relate to an electronic device, and in particular to a portable electronic device having email and calendar applications.

BACKGROUND OF THE INVENTION

It is common for users of electronic devices to communicate with one another in group email exchanges. A common occurrence in the exchange of these emails is an attempt to set up a meeting, a conference call, lunch, or some other group event. It is often difficult to find a suitable time where all of the participants in the email are available, leading to lengthy exchanges that can become frustrating and time consuming. The complexities also scale with the number of individuals in the group. In addition, users often find it difficult to memorise information while they move between an email application and a calendar application.

BRIEF DESCRIPTION OF THE DRAWINGS

Examples of the present invention will now be described in detail with reference to the accompanying drawings, in which.

DESCRIPTION OF EMBODIMENTS

In accordance with an aspect of the present invention there is provided a method of selecting a time slot in an electronic calendar, the method comprising the steps of: identifying a plurality of email users in an email message that is provided in an email application; providing a selectable calendar look-up button for the email message provided in the email application; in response to selection of the calendar look-up button, retrieving a plurality of electronic calendars respectively associated with the plurality of email users; calculating a score for a plurality of time slots in the retrieved plurality of electronic calendars; displaying at least one of the plurality of time slots based on the calculated score; receiving a selection of the at least one displayed time slot; and sending an indication of the selected time slot to the plurality of email users.

In this way, a calendar application may be launched directly from an email thread or email message in order to establish the availability of participants in the email exchange.

According to another aspect of the invention there is provided an electronic device comprising: a display; one or more processors; and memory comprising instructions which when executed by one or more of the processors cause the electronic device to: identify a plurality of email users in an email message that is provided in an email application; provide a selectable calendar look-up button for the email message provided in the email application; in response to selection of the calendar look-up button, retrieve a plurality of electronic calendars respectively associated with the plurality of email users; calculate a score for a plurality of time slots in the retrieved plurality of electronic calendars; display at least one of the plurality of time slots based on the calculated score; receive a selection of the at least one displayed time slot; and send an indication of the selected time slot to the plurality of email users.

According to yet another aspect of the invention there is provided a computer program product comprising memory comprising instructions which when executed by one or more of the processors of an electronic device cause the electronic device to: identify a plurality of email users in an email message that is provided in an email application; provide a selectable calendar look-up button for the email message provided in the email application; in response to selection of the calendar look-up button, retrieve a plurality of electronic calendars respectively associated with the plurality of email users; calculate a score for a plurality of time slots in the retrieved plurality of electronic calendars; display at least one of the plurality of time slots based on the calculated score; receive a selection of the at least one displayed time slot; and send an indication of the selected time slot to the plurality of email users.

Example Embodiment

Figure 1:
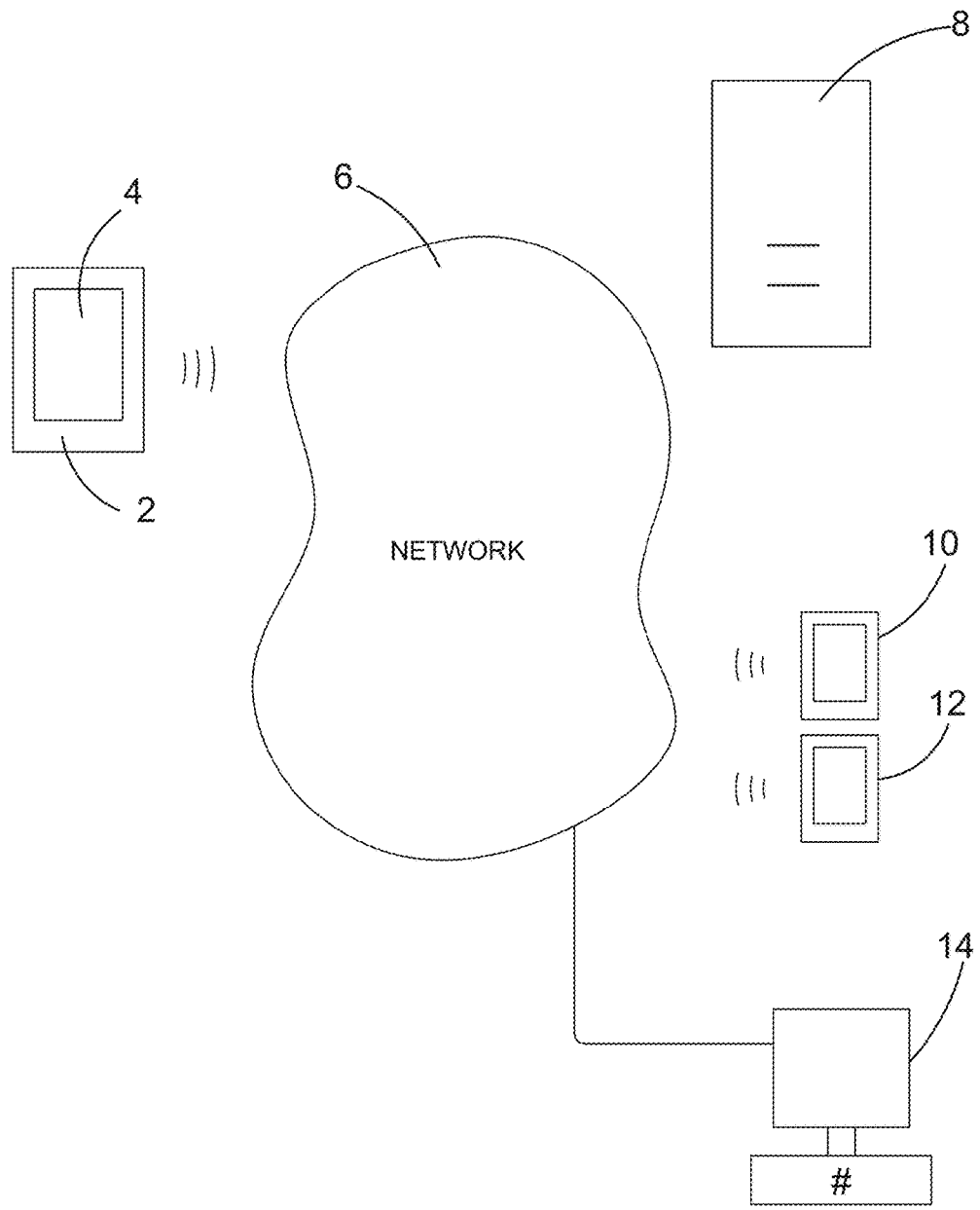
FIG. 1 is a schematic diagram illustrating an electronic device connected to other electronic devices via a network in accordance with an example embodiment.

Reference will now be made to FIG. 1 which illustrates an example user electronic device 2 in which embodiments described in the present disclosure can be implemented. The electronic device 2 comprises a memory suitable for storing computer readable instructions, and one or more processors configured to execute the computer readable instructions. The memory stores computer readable code for a number of applications, or 'apps', which include an email application and a calendar application. The electronic device 2 comprises a touch-screen 4 on which can be displayed user interfaces with which the user can interact with the device 2 and its applications.

The user electronic device 2 is embodied as a cellular smartphone which can connect wirelessly with a network 6. Connected to the network 6 is also a server 8, and other user electronic devices 10, 12, 14. In this example the other user electronic devices include smartphones 10, 12 and a personal computer 14. By way of example, the user electronic devices 2, 10, 12, 14 may alternatively be embodied as tablets, PDAs or laptops. User data may be stored locally at the user electronic device 2 or at the server 8. Equally, computer readable instructions for the user electronic device 2 may be stored at the server 8 and downloaded as required.

Figure 2:
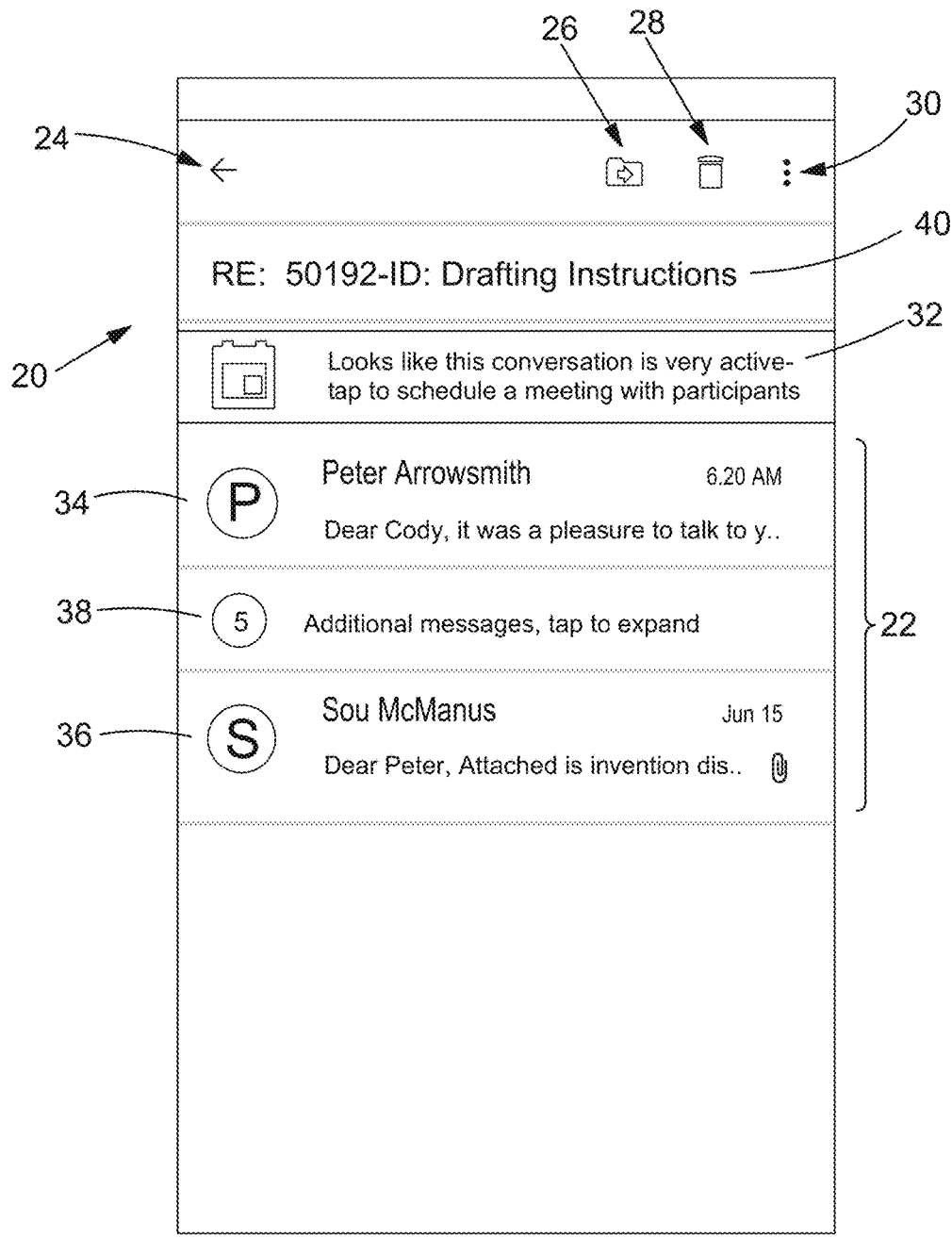
FIG. 2 is an example user interface in an electronic device in accordance with an example embodiment.

FIG. 2 is an example screenshot of a user interface 20 for an email application for display on the user electronic device 2. In this example, the user interface 20 includes an email thread 22, and a number of buttons that can be selected to activate functions related to the email thread 22. These include a 'back' button 24, an 'archive' button 26, a 'delete' button 28, and a 'further options' button 30 that can be selected to reveal further functions. A selectable 'calendar look-up' banner 32 is also provided below a subject 40 of the email thread 22.

In this example the thread 22 includes seven email messages. The sender, and the first few words of textual content are shown for the first and last messages 34, 36 in the thread 22. The email thread 22 also includes a banner 38 which can be selected to reveal five additional messages, which are initially hidden from view.

Each email message 34, 36 in the user interface 20 can be individually opened. Once opened, normal email information is visible including message content, a subject, a sender, a recipient, and any 'cc'd' addresses. Each email message 34, 36, when individually displayed, can also include the calendar look-up banner 32. Further information fields and attachments may be included in an individually displayed email in a manner that would be understood by a person skilled in the art.

Figure 3:
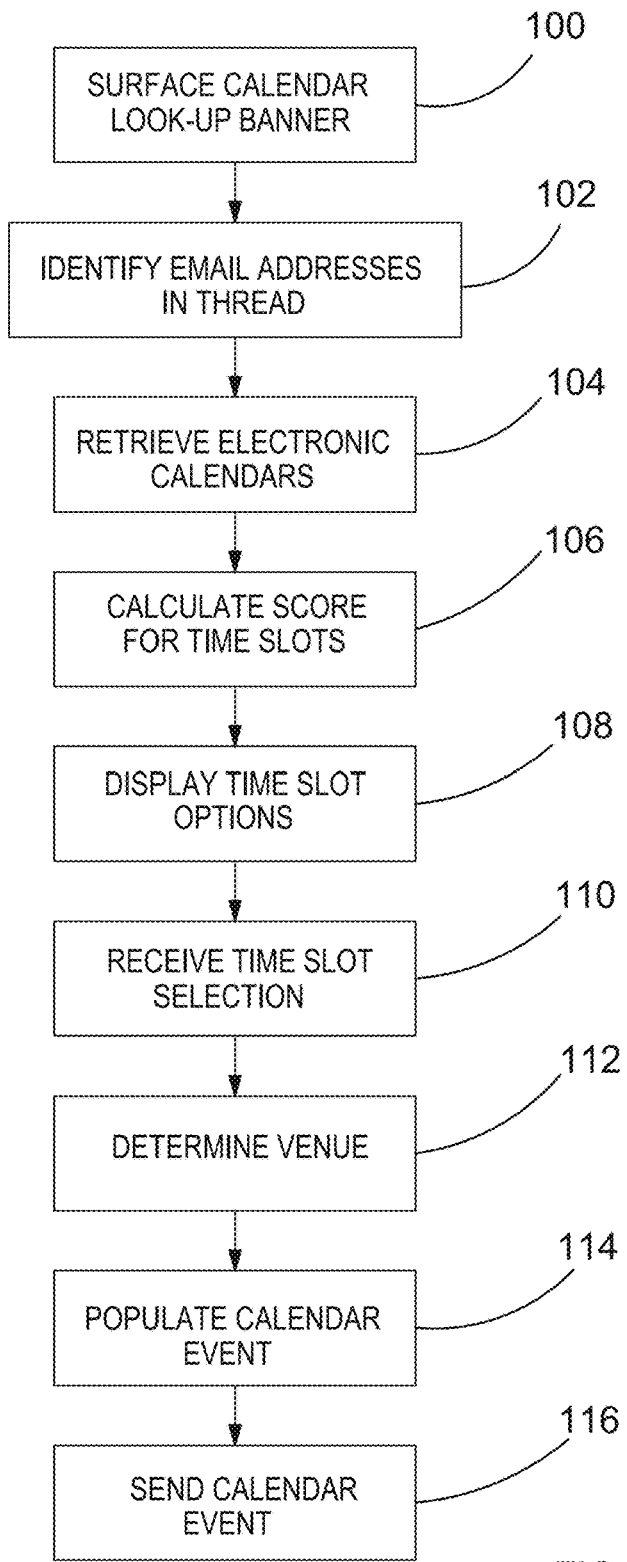
FIG. 3 is a flow diagram showing steps undertaken in and with an electronic device in accordance with an example embodiment.

FIG. 3 is a flow diagram showing a number of steps that may be undertaken at the user electronic device 2, in an example embodiment. At step 100 the 'calendar look-up button' 32 is surfaced in the user interface 20 of the email application. In certain embodiments the 'calendar look-up' button 32 is an ever-present feature in the user interface 20. However, in presently preferred embodiments the 'calendar look-up' button 32 is 'surfaced' (i.e. appears or becomes active) only when predetermined criteria are satisfied. For example, the 'calendar look-up' button 32 may be surfaced only when the number of replies in the email message is greater than a predetermined number, such as five or ten. In another arrangement the number of replies must exceed a predetermined number in a predetermined time period to ensure that the calendar look-up button is surfaced for active topics of discussion, and not simply for re-used subject lines. In another example, a parsing algorithm is provided to analyse the content of the email thread 22 and to determine whether it is likely to relate to a calendar event. The parsing algorithm can identify occurrences of key words and phrases such as "meeting", "conference call", "lunch", "dinner", "diary", "which dates", and the like. When a key word (or a combination of key-words) is detected the 'calendar look-up' button 32 is surfaced. The calendar look up button 32 is provided at the top of the email thread 22, below the subject 40 so that it is clearly visible to a user.

Upon selection of the 'calendar look-up' button 32 a calendar look-up application is launched out of the email application. The calendar look-up application may be executed at the user electronic device 2 or at the server 8, or a combination of the two, as appropriate. At step 102 the calendar look-up application identifies email addresses and users in the relevant email thread 22. This is typically achieved by identifying email addresses in the "from", "to" and "cc" fields. At step 104 the calendar look-up application retrieves electronic calendars associated with each of the identified email addresses. The electronic calendars may be retrieved directly from relevant user devices or from servers 8 where the data are stored. Retrieval of calendars may be performed using an API from Microsoft Exchange Server, or any similar protocol, as would be understood by a person skilled in the art. In this method it is presumed that retrieval of the relevant electronic calendars is both possible and permitted for the email accounts associated with the relevant users. If retrieval of a specific calendar is not permitted then an error message may be displayed on the screen 4 of the user electronic device 2. In another embodiment display of the calendar look-up button 32 may be inhibited if it is determined that retrieval of the relevant electronic calendars is not possible.

In the currently preferred embodiment the user of the electronic device 2 can enter preferred criteria for the calendar event, such as a preferred day and duration. For each calendar associate with an email address the calendar look-up application returns forty-eight time slots per day, where each time slot represents a thirty minute unit.

At step 106 the calendar look-up application is configured to calculate a score for the retrieved time slots that satisfy the user's preferred criteria. In the scoring algorithm a score of zero is provided for each time slot where an individual's calendar suggests that they are available and a score of one is provided if the individual's calendar suggests that they are busy. The data are then added together across all of the time slots. In the cumulated data set, a slot with a value of zero represents a thirty-minute interval during which every participant is free. If the user indicated a preferred duration of, say, one-hour then the scoring algorithm calculates a combined score for each combination of adjacent time slots.

At step 108 the calendar look-up application is configured to display time slot options to the user, or the calendar event organiser. The three lowest scoring options are displayed on the display 4, with the lowest scoring option at the top. If one of the displayed options has a score that is greater than zero then this indicates that at least one participant is unavailable; the identity of any unavailable individuals is displayed alongside the relevant option. The user can review the available options and can make a selection at step 110. The user's selection at step 110 is received at the electronic user device 2 or the server 8, as appropriate.

At step 112 the calendar look-up application can determine a proposed venue for the calendar event. Where the calendar event relates to a meeting the calendar look-up application is arranged to determine the location of each of the email users, as well as the location of the calendar event organiser. The calendar look-up application can then identify a meeting room or venue that is also free at the selected time slot or slots, and which is also available based on its associated electronic calendar. The meeting room may be selected based on its location relative to the email users.

At step 114 the calendar look-up application can populate a calendar event based on the content of the relevant email thread 22. The subject 40 of the email thread 22 or individual email is imported as the title of the calendar event. The text content of the email thread 22 is imported into the notes field of the calendar event, and the user of the electronic device 2 is identified as the organiser.

At step 116 the calendar event is sent, by email, to all of the relevant participants of the original email thread 22. The calendar event is also added to the electronic calendar associated with the event organiser, or user of the electronic device 2.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

Example embodiments of the present disclosure are not limited to any particular operating system, system architecture, mobile device architecture, server architecture, or computer programming language.

The various embodiments presented above are merely examples and variations of the innovations described herein will be apparent to persons of ordinary skill in the art. As embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

The invention claimed is:

1. A method of selecting a time slot in an electronic calendar, the method comprising the steps of:
    displaying a received email message in a user interface of an email application executing in an electronic device, the email message including an email thread conversation between a plurality of email users;
    identifying each email user in the plurality of email users in the email message that is provided in the email application;
    providing, in the user interface of the email application, a user-selectable calendar look-up button for the email message provided in the email application;
    in response to the electronic device receiving a selection of the calendar look-up button, retrieving at the electronic device, from storage memory of one or more user electronic devices communicatively coupled with the electronic device, from storage memory of a computer server communicatively coupled with the electronic device, or both, a plurality of electronic calendars respectively associated with the plurality of email users;
    calculating, with the electronic device, a score for each of a plurality of time slots in the retrieved plurality of electronic calendars, based on a defined criteria for scheduling a calendar event for the plurality of email users;
    displaying, in the user interface, a representation of at least one of the plurality of time slots based on the calculated score for each of the plurality of time slots;
    receiving, at the user interface, a user-selection of the at least one displayed time slot; and
    sending a calendar event, including an indication of the selected time slot, to the plurality of email users.

2. The method of claim 1, wherein the selectable calendar look-up button for the email message is provided only when the number of replies in the email message exceeds a predetermined number.

3. The method of claim 2, wherein the selectable calendar look-up button for the email message is provided only when the number of replies in the email message exceeds a predetermined number in a predetermined time period.

4. The method of claim 1, comprising the step of parsing the email message to determine whether the email message relates to a calendar event or a potential calendar event.

5. The method of claim 4, wherein the selectable calendar look-up button for the email message is provided only when the email message is determined to relate to a calendar event or a potential calendar event.

6. The method of claim 1, comprising the step of determining whether the plurality of electronic calendars respectively associated with the plurality of email users can be retrieved and wherein the selectable calendar look-up button for the email message is provided only when the plurality of electronic calendars can be retrieved.

7. The method of claim 1, wherein sending an indication of the selected time slot to the plurality of email users involves sending a calendar event for entry in the electronic calendars respectively associated with the plurality of email users.

8. The method of claim 7, comprising the step of populating fields in the calendar event with information derived from the email message.

9. The method of claim 7, wherein the calendar event includes a location which is determined based on the location of a selected email user.

10. The method of claim 7, wherein the calendar event includes a location which is determined based on the respective locations of the plurality of email users.

11. An electronic device comprising:
    a display device;
    one or more processors; and,
    memory comprising instructions which when executed by one or more of the processors cause the electronic device to:
        display, with the display device, a received email message in a user interface of an email application executing in the electronic device, the email message including an email thread conversation between a plurality of email users;
        identify each email user in the plurality of email users in the email message that is provided in the email application;
        provide, in the user interface of the email application, a user-selectable calendar look-up button for the email message provided in the email application;
        in response to the electronic device receiving a selection of the calendar look-up button, retrieve at the electronic device, from storage memory of one or more user electronic devices communicatively coupled with the electronic device, from storage memory of a computer server communicatively coupled with the electronic device, or both, a plurality of electronic calendars respectively associated with the plurality of email users;
        calculate, with the electronic device, a score for each of a plurality of time slots in the retrieved plurality of electronic calendars, based on a defined criteria for scheduling a calendar event for the plurality of email users;
        display on the display, in the user interface, a representation of at least one of the plurality of time slots based on the calculated score for each of the plurality of time slots;
        receive, at the user interface, a user-selection of the at least one displayed time slot; and
        send the calendar event, including an indication of the selected time slot to the plurality of email users.

12. A computer program product comprising memory comprising instructions which when executed by one or more of the processors of an electronic device cause the electronic device to:
    display a received email message in a user interface of an email application executing in the electronic device, the email message including an email thread conversation between a plurality of email users;

identify each email user in the plurality of email users in the email message that is provided in the email application;

provide, in the user interface of the email application, a user-selectable calendar look-up button for the email message provided in the email application;

in response to the electronic device receiving a selection of the calendar look-up button, retrieve at the electronic device, from storage memory of one or more user electronic devices communicatively coupled with the electronic device, from storage memory of a computer server communicatively coupled with the electronic device, or both, a plurality of electronic calendars respectively associated with the plurality of email users;

calculate, with the electronic device, a score for each of a plurality of time slots in the retrieved plurality of electronic calendars, based on a defined criteria for scheduling a calendar event for the plurality of email users;

display, in the user interface, a representation of at least one of the plurality of time slots based on the calculated score for each of the plurality of time slots;

receive, at the user interface, a user-selection of the at least one displayed time slot; and send the calendar event, including an indication of the selected time slot to the plurality of email users.

* * * * *